United States Patent
Wang et al.

(10) Patent No.: US 12,518,564 B1
(45) Date of Patent: Jan. 6, 2026

(54) EXPRESSION RECOGNITION METHOD INCORPORATED WITH UNCERTAINTY ESTIMATION AND ACTIVE LEARNING

(71) Applicant: Chongqing University of Technology, Chongqing (CN)

(72) Inventors: Yujian Wang, Chongqing (CN); Jianxun Zhang, Chongqing (CN); Renhao Sun, Chongqing (CN); Dandan Liao, Chongqing (CN)

(73) Assignee: Chongqing University of Technology, Chongqing (CN)

( * ) Notice: Subject to any disclaimer, the term of this patent is extended or adjusted under 35 U.S.C. 154(b) by 0 days.

(21) Appl. No.: 19/092,976

(22) Filed: Mar. 27, 2025

(30) Foreign Application Priority Data

Sep. 4, 2024 (CN) .......................... 202411235694.7

(51) Int. Cl.
*G06V 40/16* (2022.01)
*G06V 10/776* (2022.01)
*G06V 10/778* (2022.01)
*G06V 10/82* (2022.01)

(52) U.S. Cl.
CPC .......... *G06V 40/174* (2022.01); *G06V 10/776* (2022.01); *G06V 10/778* (2022.01); *G06V 10/82* (2022.01)

(58) Field of Classification Search
CPC ............... G06V 40/174; G06V 10/776; G06V 10/778; G06V 10/82
See application file for complete search history.

(56) References Cited

U.S. PATENT DOCUMENTS

| | | | | |
|---|---|---|---|---|
| 2022/0284321 A1* | 9/2022 | Yuan | ....................... | G06F 16/58 |
| 2023/0298335 A1* | 9/2023 | Griffiths | ............... | G06V 10/765 |
| | | | | 382/156 |
| 2024/0256894 A1* | 8/2024 | Chen | ...................... | G06N 3/098 |

OTHER PUBLICATIONS

Fang et al. "Rethinking Pseudo-Labeling for Semi-Supervised Facial Expression Recognition With Contrastive Self-Supervised Learning" published 2023 (Year: 2023).*
Roy et al. "Active Learning with Contrastive Pre-Training for Facial Expression Recognition" published 2023 (Year: 2023).*
(Continued)

*Primary Examiner* — Ming Y Hon

(57) ABSTRACT

The disclosure relates to the technical fields of deep learning and image processing, and provides an expression recognition method incorporated with uncertainty estimation and active learning. The expression recognition method incorporated with uncertainty estimation and active learning includes following steps: 1. contrastive self-supervised pre-training; 2. a Dynamic Re-labeling Module (DRM) incorporated with uncertainty estimation; and 3. model adjustment based on a pre-training model. In the expression recognition method incorporated with uncertainty estimation and active learning according to the disclosure, firstly, feature extraction ability of the model is improved using contrastive learning based on low-level feature representations of the whole unlabeled data set and with the improved uncertainty estimation method. Subsequently, the model is fine-tuned through the active learning based on the pre-training model, so as to select and label most informative samples more efficiently. Compared with related art, recognition accuracy is significantly improved.

1 Claim, 2 Drawing Sheets

(56) References Cited

OTHER PUBLICATIONS

Yang et al. "Facial Expression Recognition with Contrastive Learning and Uncertainty-Guided Relabeling" published May 16, 2023 (Year: 2023).*

"Facial expression recognition with contrastive learning and uncertainty-guided relabeling",yu jie yang et al., World scientific, vol. [2350032-1]-[2350032-16] Page; Jun. 30, 2023.

* cited by examiner

EXPRESSION RECOGNITION METHOD INCORPORATED WITH UNCERTAINTY ESTIMATION AND ACTIVE LEARNING

TECHNICAL FIELD

The disclosure relates to the technical fields of deep learning and image processing, in particular to an expression recognition method incorporated with uncertainty estimation and active learning.

BACKGROUND ART

Expression recognition has important applications in fields of computer vision and human-computer interaction. Traditional expression recognition methods mainly rely on manual feature extraction and machine learning algorithms, which often do not perform well in dealing with large-scale data and complex scenes. With development of deep learning technology, methods based on a deep neural network have made remarkable progress in tasks of expression recognition. However, training of a deep learning model usually needs a large number of labeled data, and a data labeling process is time-consuming, laborious and expensive.

In addition, the deep learning model is usually highly sensitive to distribution and quality of training data in a process of training and inference. Especially in a case of presence of noise labels or uneven data distribution, performance of the model may be significantly degraded. In order to solve these problems, uncertainty estimation and active learning technology are introduced. Uncertainty estimation can help recognize samples that are difficult to classify or may be wrongly classified by quantifying prediction confidence of the model for each of the samples. In active learning technology, most valuable samples can be intelligently selected for labeling, thus reducing labeling cost and improving model performance.

However, there is still little research on how to effectively combine these two methods to achieve optimal performance in related art. Therefore, there is a need for a new expression recognition method which skillfully combines the uncertainty estimation with the active learning technology to improve accuracy and robustness of expression recognition.

SUMMARY

In order to solve shortcomings of the related art, an expression recognition method incorporated with uncertainty estimation and active learning is provided in the disclosure, so as to reduce labeling cost, improve model performance and enhance generalization ability of unseen expressions.

The expression recognition method incorporated with uncertainty estimation and active learning according to the disclosure includes following steps:
  Step 1, a first stage of constructing: constructing a contrastive pre-training learning framework;
  Step 2: constructing a Simple Framework for Contrastive Learning of Visual Representations (SIMLR), a contrastive pre-training expression recognition network, which is composed of a backbone network, a global average pooling layer, a projection head and a dynamic re-labeling module;
  Step 3: constructing a re-labeling module based on uncertainty estimation, which mainly includes a self-attention weight module, logarithmic weighted cross-entropy loss, regularization sorting, and dynamic threshold re-labeling; and
  Step 4: performing the active learning.
Preferably, the step 1 includes following sub-steps:
Step 1.1, data sampling: selecting a data set and obtaining a face image data set $X=\{X_1, X_2, \ldots, X_k \ldots X_K\}$ by randomly sampling face images, in which $X_k$ indicates a face image of a k-th person, and separately saving label values corresponding to faces as $y=\{y_1, y_2, \ldots, y_k \ldots y_K\}$, in which $y_k$ indicates a label value corresponding to a k-th face image; and
Step 1.2: adjusting a size of each face image in the data set X and performing normalization of pixel values, and then applying random transformation (rotation, cropping, color adjustment, etc.) to obtain a data augmentation image $X'=\{X'_1, X'_2, \ldots, X'_k \ldots X'_K\}$, $X''=\{X''_1, X''_2, \ldots, X''_k \ldots X''_K\}$, in which $X'_k$ and $X''_K$ respectively indicate random data augmentation views of the k-th sample, which are taken as a positive sample pair.
Preferably, the step 2 includes following sub-steps:
Step 2.1: the backbone network is a ResNet18 network and includes a first convolution block, a second convolution block, a third convolution block, a fourth convolution block, a fifth convolution block and a sixth fully connected block in sequence; and
a convolution kernel of the first convolution block is $m_1 \times m_2$, the second convolution block is composed of a residual block, and the third convolution block is composed of a residual block; the fourth convolution block is composed of two residual blocks; the fifth convolution block is composed of two residual blocks; and the sixth fully connected block includes a global average pooling and fully connected layer, each of the residual blocks contains two 3×3 convolution kernels;
Step 2.2: respectively inputting X', X" into the backbone network for processing and for sequentially processing by five convolution blocks so as to respectively output k-th enhanced graphic feature maps $F'_k$, $F''_k$, and compressing a spatial dimension of each of the feature maps to a single value by the global average pooling layer to obtain two feature vectors $z_i$, $z_j$ with a fixed length; and
Step 2.3, calculation of contrastive loss and training: calculating cosine similarity of a positive sample pair $z_i$, $z_j$; selecting a negative sample from a current batch, a feature vector of each view being a negative sample to feature vectors of other views; maximizing similarity of each positive sample pair using formula (1) while minimizing its similarity with all of negative sample pairs, $$L_{i,j} = \frac{1}{|P(i)|}\sum_{p\in P(i)} -\log\frac{\exp\left(\frac{\sin(z_i, z_j)}{\tau}\right)}{\sum_{a=1}^{N} 1_{[a\neq 1]}\exp\left(\frac{\sin(z_i, z_a)}{\tau}\right)} \quad (1)$$

in formula (1), $z_i$, $z_j$ are respectively embedding representations of a sample i and a positive sample p, $z_a$ is an embedding representation of a negative sample, $\tau$ is a temperature parameter and $1_{[k\neq i]}$ is an indicator function, which is 1 when $k\neq i$, otherwise 0; and $P(i)=\{p\in\{1, \ldots, N\}|y_p=y_i, p\neq i\}$ is a positive sample set.
Preferably, the step 3 includes following sub-steps:
Step 3.1: calculating self-attention weight, in which after $F_k''$ is input into a Softmax classifier for back propagation, a feature weight $W_a^T$ of a fully connected FC layer is extracted and is feature weighted with the sample X, and a feature weight corresponding to each image sample is obtained using formula (2);

$$\alpha_i = \sigma(W_a^T F''_i) \qquad (2)$$

in formula (2), $\alpha_i$ is a feature weight of an i-th sample, $W_a^T$ is a weight coefficient of the fully connected layer, and $\sigma$ is a Sigmod function;

Step 3.2: calculating logarithmic weighted cross-entropy loss $L_{WCE}$ using formula (3);

$$L_{WCE} = -\frac{1}{N}\sum_{i=1}^{N} \log \frac{e^{\alpha_i W_{y_i}^T F''_i}}{\sum_{j=1}^{C} e^{\alpha_i W_j^T F''_i}} \qquad (3)$$

in which $W_j$ is a weight of a j-th classifier;

Step 3.3: regularization sorting, in which firstly attention weights are sorted in a descending order, and then are proportionally divided into two groups: a high standard-deviation attention weight group $a_s$ and a low standard-deviation attention weight group $a_u$; and then rank regularization by formulas (4) and (5) is adopted to ensure that a standard-deviation attention weight of a high importance group is slightly higher than a standard-deviation attention weight of a low importance group;

$$L_{RR} = \max\{0, \delta_1 - (\alpha_s - \alpha_u)\} \qquad (4)$$

in formula (4), $\delta_1$ is a marginal value that controls a proportion of a total number of low importance populations, and in training, a comprehensive loss function is defined as:

$$L_{all} = \gamma L_{RR} + (1-\gamma) L_{WCE} \qquad (5)$$

in formula (5), $\gamma$ is a trade-off ratio;

Step 3.4: dynamic threshold re-labeling, in which uncertain samples usually show low importance weights, that is $a_u$, the re-labeling module evaluates samples with low importance weights according to sample data in $a_u$ using a Softmax probability method; highest predicted probability is compared with probability assigned to an original label using formulas (6) and (7); and when the highest predicted probability exceeds the probability, a corresponding sample is redistributed with a new pseudo-label; operations of a dynamic threshold relabeling process are as follows:

$$y' = \begin{cases} l_{max} & \text{if } P_{max} - P_{getInd} > \delta_2 \\ l_{org} & \text{otherwise} \end{cases} \qquad (6)$$

$$\delta_2 = \begin{cases} \delta_2 + \text{increase} & \text{if } bestval > Td \\ \max(0, \delta_2 - \text{decrease}) & \text{otherwise} \end{cases} \qquad (7)$$

in formula (6), $\delta_2$ is a threshold, $P_{max}$ is a value with the highest predicted probability, $P_{getInd}$ indicates probability of a given label value; and $l_{max}$ and $l_{org}$ are an index of an original given label and an index of a maximum predicted value, respectively;

in formula (7), "increase" and "decrease" indicate a magnitude of each adjustment; and Step 3.5: performing training on a contrastive supervised pre-training network based on a total loss function $L_{all}$, and stopping the training when a number of training iterations reaches a set number or the total loss function $L_{all}$ converges, so as to obtain an optimal facial expression feature extraction network model $M_p$ for subsequent active learning.

Preferably, the step 4 includes following sub-steps:

Step 4.1: dividing the face data set X into a small-scale labeled data set $D^L = \{D_1^L, D_2^L, \ldots, D_k^L \ldots D_K^L\}$ and an unlabeled data set $D^U = \{D_1^U, D_2^U, \ldots, D_k^U \ldots D_K^U\}$ with a large amount of data, in which last positions Initial_points in a data set where $D^L$ is located are starting points to distinguish whether there is labeled data or not; and Step 4.2: performing a minimum confidence method, in which a number of learning rounds is set to be 7, and in each round of active learning, the model $M_p$ selects a batch size of samples from the unlabeled data set $D^U$, and performs expression class determination on an eigenvalue $F_k^U$ of each sample $D_k^U$ in $D^U$ through a Softmax classifier to obtain an expression class predicted probability $P^U = \{P_1^U, P_2^U, \ldots, P_m^U, \ldots, P_M^U\}$ corresponding to $D^U$, and all of unlabeled samples are sorted according to highest confidence $P_{max} = \max(P^U)$ in an ascending order, and a sample with highest confidence sorted lowest is selected as a sample selected for the active learning and recorded as $D^{new} = \{X_1^{new}, X_2^{new}, \ldots, X_k^{new} \ldots X_k^{new}\}$, in which $X_k^{new}$ indicates a selected sample with a k-th highest confidence which is smallest in the batch; newly labeled data $D^{new}$ is added to the labeled data set $D^L$ and these samples are removed from the unlabeled data set $D^U$; and Step 4.3: retraining with the updated labeled data set $D^L$ or fine-tuning the model $M_p$ to generate a new model $M_{p+1}$; and evaluating performance of the model on a verification set until a budget is reached or 7 rounds of active learning are completed.

Compared with the related art, the expression recognition method incorporated with uncertainty estimation and active learning according to the disclosure has following beneficial effects.

1. Labeling efficiency is improved. By combining uncertainty estimation with an active learning strategy, most informative samples are dynamically selected for labeling, thus effectively reducing amount of data required for labeling and reducing cost and time of data labeling.

2. Performance of the model is improved. An uncertainty estimation method is used to identify samples that are difficult to classify or may be wrongly classified, and training is performed specially for these samples with the active learning strategy, which significantly improves recognition accuracy and robustness of the model.

3. Generalization ability for unseen expressions is enhanced. In a process of multiple rounds of cyclic training and model updating, the model is constantly adapted to the newly added samples, which improves the generalization ability for unseen expressions and makes it more robust in practical applications.

4. Adaption to data imbalance and noise labels can be realized. Even in a case of an unbalanced data set or containing noise labels, this method can effectively improve the performance of the model through the uncertainty estimation and active learning strategy, and performance degradation caused by data imbalance or noise labels can be reduced.

5. An over-fitting risk is reduced. The active learning strategy gives priority to selecting samples with high uncertainty for labeling and training, so as to avoid overtraining of known samples, thus reducing the over-fitting risk and improving the generalization ability of the model.

DETAILED DESCRIPTION

The disclosure will be further explained with reference to drawings and embodiments.

Figure 1:
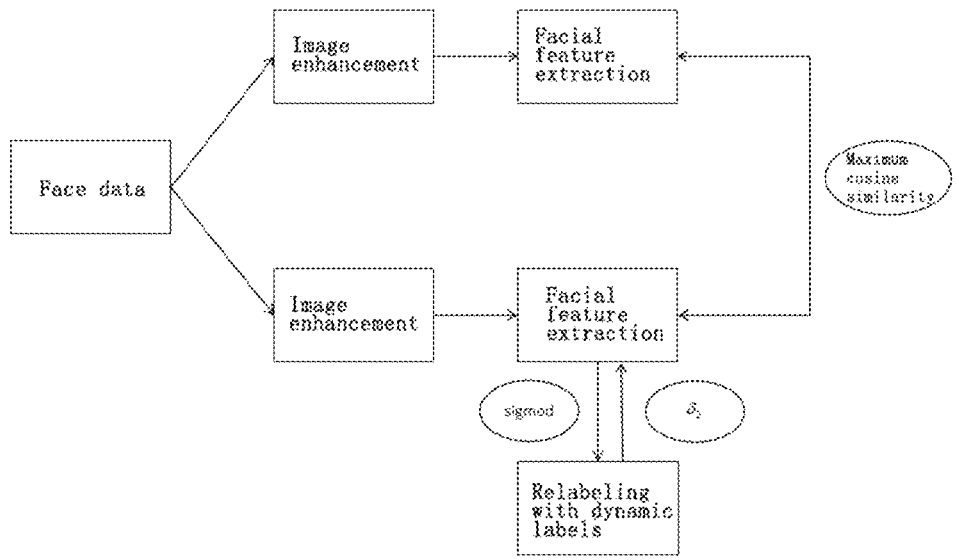
FIG. 1 is a view of a contrastive learning pre-training framework incorporated with uncertainty estimation and active learning according to the disclosure.

For an expression recognition method incorporated with uncertainty estimation and active learning according to an embodiment of the present disclosure, its first-stage pre-training part is shown in FIG. 1, which is carried out in following steps.

Step 1, a first stage of constructing: a contrastive pre-training learning framework is constructed.

Step 1.1, data sampling: a data set is selected and a face image data set $X=\{X_1, X_2, \ldots, X_k \ldots X_K\}$ is obtained by randomly sampling face images, in which $X_k$ indicates a face image of a k-th person, and label values corresponding to faces are separately saved as $y=\{y_1, y_2 \ldots y_k \ldots y_K\}$, in which $y_k$ indicates a label value corresponding to a k-th face image.

Step 1.2: a size of each face image in the data set X is adjusted and normalization of pixel values is performed, and then random transformation (rotation, cropping, color adjustment, etc.) is applied to obtain a data augmentation image $X'=\{X'_1, X'_2, \ldots, X'_k \ldots X'_K\}$, $X''=\{X''_1, X''_2, \ldots, X''_k \ldots X''_K\}$, in which $X'_k$ and $X''_K$ respectively indicate random data augmentation views of the k-th sample, which are taken as a positive sample pair. In this embodiment, random cropping and random horizontal flipping are used in training data for enhancement.

Step 2: a Simple Framework for Contrastive Learning of Visual Representations (SIMLR), a contrastive pre-training expression recognition network, is constructed, which is composed of a backbone network, a global average pooling layer, a projection head and a dynamic re-labeling module.

Step 2.1: the backbone network is a ResNet18 network and includes a first convolution block, a second convolution block, a third convolution block, a fourth convolution block, a fifth convolution block and a sixth fully connected block in sequence; and a convolution kernel of the first convolution block is $m_1 \times m_2$, the second convolution block is composed of a residual block, and the third convolution block is composed of a residual block; the fourth convolution block is composed of two residual blocks; the fifth convolution block is composed of two residual blocks; and the sixth fully connected block includes a global average pooling and fully connected layer, each of the residual blocks contains two 3×3 convolution kernels;

Step 2.2: X', X" are respectively input into the backbone network for processing and for sequentially processing by five convolution blocks so as to respectively output k-th enhanced graphic feature maps $F'_k$, $F''_K$, and a spatial dimension of each of the feature maps is compressed to a single value by the global average pooling layer to obtain two feature vectors $z_i$, $z_j$ with a fixed length. In this embodiment, the enhanced image is input into a face image of 224×224×3, and a feature of 7×7×512 is obtained after continuous passing through a convolution layer and four residual blocks, and then downsampled by a global average pooling layer, and finally a feature map with a size of 1×1×512 is obtained from an output of the model.

Step 2.3, calculation of contrastive loss and training: cosine similarity of a positive sample pair $z_i$, $z_j$ is calculated. A negative sample is selected from a current batch. A feature vector of each view is a negative sample to feature vectors of other views. Similarity of each positive sample pair is maximized using formula (1) while its similarity with all of negative sample pairs is minimized.

$$L_{i,j} = \frac{1}{|P(i)|}\sum_{p\in P(i)} -\log\frac{\exp\left(\frac{\sin(z_i, z_j)}{\tau}\right)}{\sum_{a=1}^{N} 1_{[a\neq i]}\exp\left(\frac{\sin(z_i, z_a)}{\tau}\right)} \quad (1)$$

in formula (1), $z_i$, $z_j$ are respectively embedding representations of a sample i and a positive sample p, $z_a$ is an embedding representation of a negative sample, t is a temperature parameter and $1_{[k\neq i]}$ is an indicator function, which is 1 when k≠i, otherwise 0; and $P(i)=\{p\in\{1, \ldots, N\}|y_p=y_i, p\neq i\}$ is a positive sample set.

Figure 2:
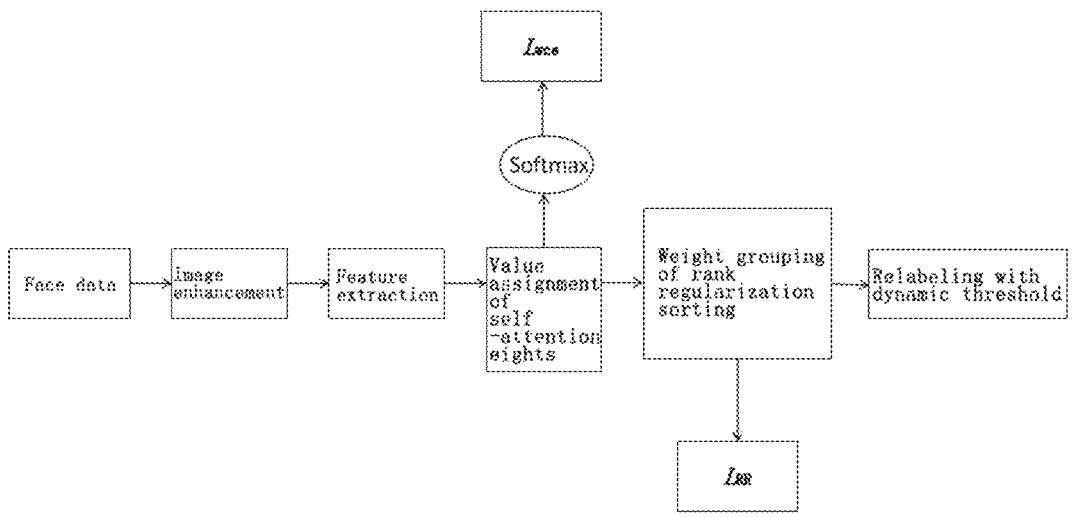
FIG. 2 is a structural view of relabeling with dynamic labels according to the disclosure.

Step 3: a re-labeling module is constructed based on uncertainty estimation, a main structure of which is shown as FIG. 2 and which mainly includes a self-attention weight module, logarithmic weighted cross-entropy loss, regularization sorting, and dynamic threshold re-labeling.

Step 3.1: self-attention weight is calculated, in which after $F_k''$ is input into a Softmax classifier for back propagation, a feature weight $W_a^T$ of a fully connected FC layer is extracted and is feature weighted with the sample X, and a feature weight corresponding to each image sample is obtained using formula (2).

$$\alpha_i = \sigma(W_a^T F''_i) \quad (2)$$

in formula (2), $a_i$ is a feature weight of an i-th sample, $W_a^T$ is a weight coefficient of the fully connected layer, and σ is a Sigmod function.

Step 3.2: logarithmic weighted cross-entropy loss $L_{WCE}$ is calculated using formula (3).

$$L_{WCE} = -\frac{1}{N}\sum_{i=1}^{N}\log\frac{e^{\alpha_i W_{y_i}^T F''_i}}{\sum_{j=1}^{C} e^{\alpha_i W_j^T F''_i}} \quad (3)$$

in which $W_j$ is a weight of a j-th classifier. The logarithmic weighted cross-entropy loss can be established to accurately reflect a process of loss weighting using the attention weights.

Step 3.3, regularization sorting: firstly the attention weights are sorted in a descending order, and then are proportionally divided into two groups: a high standard-deviation attention weight group $a_s$ and a low standard-deviation attention weight group $a_u$. Then rank regularization by formulas (4) and (5) is adopted to ensure that a standard-deviation attention weight of a high importance group is slightly higher than a standard-deviation attention weight of a low importance group. In this embodiment, their ratio is 8:2.

$$L_{RR} = \max\{0, \delta_1 - (\alpha_s - \alpha_u)\} \quad (4)$$

in formula (4), $\delta_1$ is a marginal value that controls a proportion of a total number of low importance populations, and in training, a comprehensive loss function is defined as:

$$L_{all} = \gamma L_{RR} + (1-\gamma) L_{WCE} \quad (5)$$

In formula (5), $\gamma$ is a trade-off ratio.

In this embodiment, $\delta_1$ is set to 0.07.

Step 3.4, dynamic threshold re-labeling: uncertain samples usually show low importance weights, that is $\alpha_u$, the re-labeling module evaluates samples with low importance weights according to sample data in $\alpha_u$ using a Softmax probability method. Highest predicted probability is compared with probability assigned to an original label using formulas (6) and (7). When the highest predicted probability exceeds the probability, a corresponding sample is redistributed with a new pseudo-label. Operations of a dynamic threshold relabeling process are as follows:

$$y' = \begin{cases} l_{max} & \text{if } P_{max} - P_{gtInd} > \delta_2 \\ l_{org} & \text{otherwise} \end{cases} \quad (6)$$

$$\delta_2 = \begin{cases} \delta_2 + \text{increase} & \text{if } bestval > Td \\ \max(0, \delta_2 - \text{decrease}) & \text{otherwise} \end{cases} \quad (7)$$

in formula (6), $\delta_2$ is a threshold, $P_{max}$ is a value with the highest predicted probability, $P_{gtInd}$ indicates probability of a given label value. $l_{max}$ and $l_{org}$ are an index of an original given label and an index of a maximum predicted value, respectively.

in formula (7), "increase" and "decrease" indicate a magnitude of each adjustment.

In this example, $\delta_2$ is set to 0.2 and "increase" and "decrease" are set to 0.05.

Step 3.5: training is performed on a contrastive supervised pre-training network based on a total loss function $L_{all}$, and the training is stopped when a number of training iterations reaches a set number or the total loss function $L_{all}$ converges, so as to obtain an optimal facial expression feature extraction network model $M_p$ for subsequent active learning. In this embodiment, batch_size is set to 1024.

Figure 3:
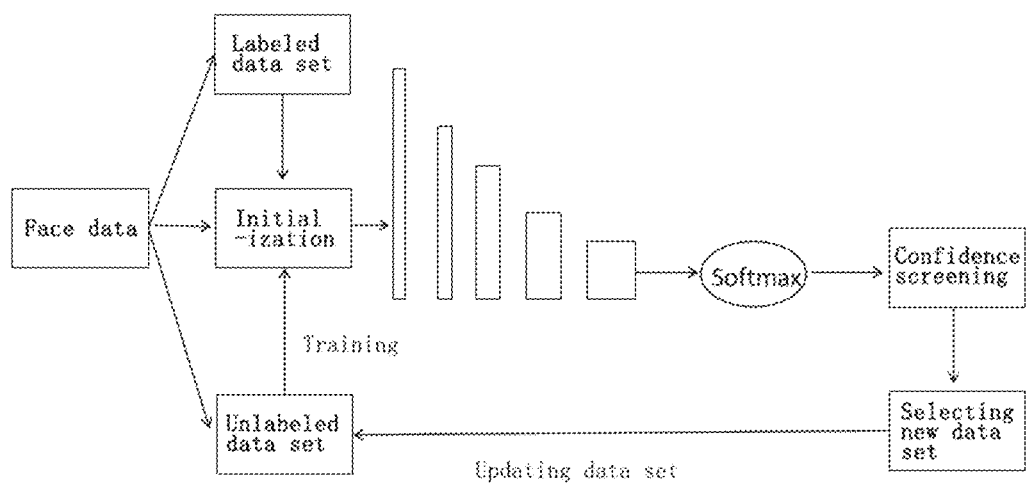
FIG. 3 is a structural view of an active learning part in the method according to the disclosure.

Step 4: the active learning is performed, a main structure of which is shown in FIG. 3.

Step 4.1: the face data set X is divided into a small-scale labeled data set $D^L = \{D_1^L, D_2^L, \ldots, D_k^L \ldots D_K^L\}$ and an unlabeled data set $D^U = \{D_1^U, D_2^U, \ldots, D_k^U \ldots D_K^U\}$ with a large amount of data. Last positions Initial_points in a data set where $D^L$ is located are starting points to distinguish whether there is labeled data or not. In this embodiment, initial_points is set to be 10% of the data set.

Step 4.2: a minimum confidence method is performed, in which a number of learning rounds is set to be 7, and in each round of active learning, the model $M_p$ selects a batch size of samples from the unlabeled data set $D^U$, and performs expression class determination on an eigenvalue $F_k^U$ of each sample $D_k^U$ in $D^U$ through a Softmax classifier to obtain an expression class predicted probability $P^U = \{P_1^U, P_2^U, \ldots, P_m^U, \ldots, P_M^U\}$ corresponding to $D^U$, and all of unlabeled samples are sorted by highest confidence $P_{max} = \max(P^U)$ in an ascending order, and a sample with highest confidence sorted lowest is selected as a sample selected for the active learning and recorded as $D^{new} = \{X_1^{new}, X_2^{new}, \ldots, X_k^{new} \ldots X_K^{new}\}$, in which $X_k^{new}$ indicates a selected sample with a k-th highest confidence which is smallest in the batch. Newly labeled data $D^{new}$ is added to the labeled data set $D^L$ and these samples are removed from the unlabeled data set $D^U$. In this embodiment, the feature map output by the model is input to the global average pooling layer AavgPool for processing, and finally the predicted class probability value is given by an activation function softmax. The active learning can be used to select those facial expression samples currently with highest uncertainty for the model for further labeling and training. In this way, the model can deal with complex and uncertain samples more effectively and improve performance and robustness of the whole model.

Step 4.3: retraining with the updated labeled data set $D^L$ or fine-tuning of the model $M_p$ is performed to generate a new model $M_{p+1}$. Performance of the model on a verification set is evaluated until a budget is reached or 7 rounds of active learning are completed. In this embodiment, an Adam optimizer is adopted, with an initial learning rate of 1e-3 and an attenuation mode of attenuating to 0.1 times of an original value every 100 times, and a trained model is obtained after 500 training iterations.

In order to verify effectiveness of the method according to the disclosure, existing active learning methods on FER13, RAF-DB and KDEF are selected for comparison and verification. Table 1 shows comparison of accuracy of expression recognition with various active learning methods.

TABLE 1

Comparison with other algorithms

| Methods | FER13 | RAF-DB | KDEF |
|---|---|---|---|
| Random Sampling (baseline) | 63.16 | 73.82 | 83.77 |
| Entropy | 65..88 | 76.99 | 81.78 |
| Margin | 65.97 | 76.88 | 83.55 |
| Least Confidence | 65.83 | 77.33 | 87.03 |
| BADGE | 64.22 | 76.88 | 84.22 |
| GLISTER | 64.13 | 76.88 | 84.71 |
| CoreSet | 64.90 | 75.11 | 81.22 |
| Bald | 65.22 | 75.32 | 79.88 |
| Adv.deepfool | 64.21 | 78.01 | 80.11 |
| Pre-training + DRM + Least Confidence(Ours) | 66.81 | 80.70 | 94.17 |

Compared with the related art, the expression recognition method incorporated with uncertainty estimation and active learning according to the disclosure has following beneficial effects.

The method is divided into two main stages: firstly, the model performs self-supervised pre-training through contrastive learning and uncertainty estimation to enhance feature extraction ability. Then, the model is fine-tuned by using knowledge obtained in a pre-training stage. This method makes full use of limited data labels, which helps alleviate dependence on a large number of labeled data and a cold start problem in active learning of a small data set, thus significantly improving recognition accuracy.

The above is only embodiments of the present disclosure, which does not limit a protection scope of the present disclosure. Any equivalent structure or equivalent process transformation made with the specification and drawings of the present disclosure, which is directly or indirectly applied to other related technical fields, is included within the protection scope of the disclosure.

What is claimed is:

1. A computer-implemented expression recognition method incorporated with uncertainty estimation and active learning, comprising:
    Step 1, a first stage of constructing: constructing a contrastive pre-training learning framework, the step 1 comprising:

Step 1.1, data sampling: selecting a data set and obtaining a face image data set $X=\{X_1, X_2, \ldots, X_k \ldots X_K\}$ by randomly sampling face images, wherein $X_k$ indicates a face image of a k-th person; and separately saving label values corresponding to faces as $y=\{y_1, y_2, \ldots, y_k \ldots y_K\}$, wherein $y_k$ indicates a label value corresponding to a k-th face image; and Step 1.2: adjusting a size of each face image in the data set X and performing normalization of pixel values, and then applying random transformation to obtain a data augmentation image $X'=\{X'_1, X'_2, \ldots, X'_k \ldots X'_K\}$, $X''=\{X''_1, X''_2, \ldots, X''_k \ldots X''_K\}$, wherein $X'_k$ and $X''_k$ respectively indicate random data augmentation views of the k-th sample, which are taken as a positive sample pair;

Step 2: constructing a Simple Framework for Contrastive Learning of Visual Representations (SimCLR), a contrastive pre-training expression recognition network, which is composed of a backbone network, a global average pooling layer, a projection head and a dynamic re-labeling module, the step 2 comprising:

Step 2.1: the backbone network being a ResNet18 network and comprising a first convolution block, a second convolution block, a third convolution block, a fourth convolution block, a fifth convolution block and a sixth fully connected block in sequence; and a convolution kernel of the first convolution block being $m_1 \times m_2$, the second convolution block being composed of a residual block, and the third convolution block being composed of a residual block; the fourth convolution block being composed of two residual blocks; the fifth convolution block being composed of two residual blocks; and the sixth fully connected block comprising a global average pooling and fully connected layer, each of the residual blocks containing two 3×3 convolution kernels; wherein $m_1$ and $m_2$ are positive integers that define a height and a width of the convolution kernel, respectively;

Step 2.2: respectively inputting X', X" into the backbone network for processing and for sequentially processing by five convolution blocks so as to respectively output k-th enhanced graphic feature maps $F'_k$, $F''_k$, and compressing a spatial dimension of each of the feature maps to a single value by the global average pooling layer to obtain two feature vectors $z_i$, $z_j$ with a fixed length; and Step 2.3, calculation of contrastive loss and training: calculating cosine similarity of a positive sample pair $z_i$, $z_j$; selecting a negative sample from a current batch, a feature vector of each view being a negative sample to feature vectors of other views; maximizing similarity of each positive sample pair using formula (1) while minimizing its similarity with all of negative sample pairs, $$L_{i,j} = \frac{1}{|P(i)|} \sum_{p \in P(i)} -\log \frac{\exp\left(\frac{\sin(z_i, z_j)}{\tau}\right)}{\sum_{a=1}^{N} 1_{[a \neq i]} \exp\left(\frac{\sin(z_i, z_a)}{\tau}\right)} \quad (1)$$

in formula (1), $L_{i,j}$ represents a contrastive loss for a positive pair of samples i and j, $z_i$, $z_j$ are respectively embedding representations of a sample i and a positive sample P, $z_a$ is an embedding representation of a negative sample, $\tau$ is a temperature parameter and $1_{[k \neq i]}$ is an indicator function, which is 1 when k≠i, otherwise 0; and $P(i)=\{p \in \{1, \ldots, N\} | y_p = y_i, p \neq i\}$ is a positive sample set;

Step 3: constructing a re-labeling module based on uncertainty estimation, which mainly comprises a self-attention weight module, logarithmic weighted cross-entropy loss, regularization sorting, and dynamic threshold re-labeling, the step 3 comprising:

Step 3.1: calculating self-attention weight, wherein after $F''_k$ is input into a Softmax classifier for back propagation, a feature weight $W_a^T$ of a fully connected (FC) layer is extracted and is feature weighted with the sample X, and a feature weight corresponding to each image sample is obtained using formula (2);

$$\alpha_i = \sigma(W_a^T F''_i) \quad (2)$$

in formula (2), $\alpha_i$ is a feature weight of an i-th sample, $W_a^T$ is a weight coefficient of the fully connected layer, and $\sigma$ is a Sigmod function;

Step 3.2: calculating logarithmic weighted cross-entropy loss $L_{WCE}$ using formula (3);

$$L_{WCE} = -\frac{1}{N} \sum_{i=1}^{N} \log \frac{e^{\alpha_i W_{y_i}^T F''_i}}{\sum_{j=1}^{C} e^{\alpha_i W_j^T F''_i}} \quad (3)$$

wherein $W_j$ is a weight of a j-th classifier;

Step 3.3: regularization sorting, wherein firstly attention weights are sorted in a descending order, and then are proportionally divided into two groups: a high standard-deviation attention weight group $a_s$ and a low standard-deviation attention weight group $a_u$; and then rank regularization by formulas (4) and (5) is adopted to ensure that a standard-deviation attention weight of a high importance group is slightly higher than a standard-deviation attention weight of a low importance group;

$$L_{RR} = \max\{0, \delta_1 - (\alpha_s - \alpha_u)\} \quad (4)$$

in formula (4), $\delta_1$ is a marginal value that controls a proportion of a total number of low importance populations, $L_{RR}$ is a rank regularization loss, and in training, a comprehensive loss function is defined as:

$$L_{all} = \gamma L_{RR} + (1-\gamma) L_{WCE} \quad (5)$$

in formula (5), $\gamma$ is a trade-off ratio;

Step 3.4: dynamic threshold re-labeling, wherein uncertain samples usually show low importance weights, that is $\alpha_u$, the re-labeling module evaluates samples with low importance weights according to sample data in $\alpha_u$ using a Softmax probability method; highest predicted probability is compared with probability assigned to an original label using formulas (6) and (7); and when the highest predicted probability exceeds the probability, a corresponding sample is redistributed with a new pseudo-label; operations of a dynamic threshold relabeling process are as follows:

$$y' = \begin{cases} l_{max} & \text{if } P_{max} - P_{getInd} > \delta_2 \\ l_{org} & \text{otherwise} \end{cases} \quad (6)$$

$$\delta_2 = \begin{cases} \delta_2 + \text{increase} & \text{if } bestval > Td \\ \max(0, \delta_2 - \text{decrease}) & \text{otherwise} \end{cases} \quad (7)$$

in formula (6), $\delta_2$ is a threshold, $P_{max}$ is a value with the highest predicted probability, $P_{gtInd}$ indicates probability of a given label value; and $l_{max}$ and $l_{org}$ are an index of an original given label and an index of a maximum predicted value, respectively;

in formula (7), "increase" and "decrease" indicate a magnitude of each adjustment; and Step 3.5: performing training on a contrastive supervised pre-training network based on a total loss function $L_{all}$, and stopping the training when a number of training iterations reaches a set number or the total loss function $L_{all}$ converges, so as to obtain an optimal facial expression feature extraction network model $M_p$ for subsequent active learning; and Step 4: performing the active learning, the step 4 comprising:

Step 4.1: dividing the face data set X into a small-scale labeled data set $D^L=\{D_1^L, D_2^L, \ldots, D_k^L \ldots D_K^L\}$ and an unlabeled data set $D^U=\{D_1^U, D_2^U, \ldots, D_k^U \ldots D_K^U\}$ with a large amount of data, wherein last positions Initial_points in a data set where $D^L$ is located are starting points to distinguish whether there is labeled data or not; and Step 4.2: performing a minimum confidence method, wherein a number of learning rounds is set to be 7, and in each round of active learning, the model $M_p$ selects a batch size of samples from the unlabeled data set $D^U$, and performs expression class determination on an eigenvalue $F_k^U$ of each sample $D_k^U$ in $D^U$ through a Softmax classifier to obtain an expression class predicted probability $P^U=\{P_1^U, P_2^U, \ldots, P_m^U, \ldots, P_M^U\}$ corresponding to $D^U$, and all of unlabeled samples are sorted according to highest confidence $P_{max}=\max(P^U)$ in an ascending order, and a sample with highest confidence sorted lowest is selected as a sample selected for the active learning and recorded as $D^{new}=\{X_1^{new}, X_2^{new}, \ldots, X_k^{new} \ldots X_K^{new}\}$, wherein $X_k^{new}$ indicates a selected sample with a k-th highest confidence which is smallest in the batch; newly labeled data $D^{new}$ is added to the labeled data set $D^L$ and these samples are removed from the unlabeled data set $D^U$; and Step 4.3: retraining with the updated labeled data set $D^L$ or fine-tuning the model $M_p$ to generate a new model $M_{p+1}$; and evaluating performance of the model on a verification set until a budget is reached or 7 rounds of active learning are completed; wherein the active learning fine-tunes the model $M_p$ by iteratively selecting and labeling informative samples from an unlabeled data set to generate an updated model $M_{p+1}$;

Step 5: processing a new facial image using the updated model $M_{p+1}$ to output a recognized facial expression.

* * * * *